United States Patent [19]
Kikuchi

[11] Patent Number: 5,028,125
[45] Date of Patent: Jul. 2, 1991

[54] ZOOM FINDER OF REAL IMAGE TYPE
[75] Inventor: Shuichi Kikuchi, Yokohama, Japan
[73] Assignee: Ricoh Company, Ltd., Tokyo, Japan
[21] Appl. No.: 497,347
[22] Filed: Mar. 22, 1990
[30] Foreign Application Priority Data
  Apr. 5, 1989 [JP] Japan .................................. 1-86373
[51] Int. Cl.⁵ ..................... G02B 23/14; G02B 15/15; G02B 15/16; G03B 13/02
[52] U.S. Cl. .................................. 350/570; 350/560; 350/427; 350/423
[58] Field of Search ............... 350/560, 570, 423, 427; 354/155, 199, 201, 219

[56] References Cited
U.S. PATENT DOCUMENTS

| | | | |
|---|---|---|---|
| 2,906,172 | 9/1959 | Klemt | 350/423 |
| 3,348,898 | 10/1962 | Baur et al. | 350/423 |
| 3,385,190 | 5/1968 | Sho et al. | 354/201 |
| 3,433,559 | 3/1969 | Vockenhuber et al. | 350/570 |
| 4,240,700 | 12/1980 | Ogawa et al. | 350/423 |
| 4,249,793 | 2/1981 | Uehava | 350/560 |
| 4,624,536 | 11/1986 | Nakagawa | 350/423 |
| 4,779,969 | 10/1988 | Sato et al. | 350/560 |
| 4,842,385 | 6/1989 | Tanaka | 350/427 |
| 4,842,395 | 6/1989 | Sato et al. | 350/560 |
| 4,906,078 | 3/1990 | Inabata et al. | 350/560 |

FOREIGN PATENT DOCUMENTS
1282314 11/1968 Fed. Rep. of Germany ...... 350/423
129225 5/1989 Japan ................................ 350/423

Primary Examiner—Jon W. Henry
Attorney, Agent, or Firm—Oblon, Spivak, McClelland, Maier & Neustadt

[57] ABSTRACT

A zoom finder of a real image type comprises an objective lens composed of a first lens group having a positive refracting power, a second lens group having a negative refracting power, and a third lens group having a positive refracting power, the objective lens having a positive refracting power as a whole; an eyepiece composed of a fourth lens group having a positive refracting power; a device for forming a real image by the objective lens between the third and fourth lens groups and observing this real image through the eyepiece; and a device for increasing the magnification of the finder by moving the second lens group from an object side to an eyepiece side. The change is diopter of the finder caused by a zooming operation in the movement of the second lens group is corrected by displacing the first and third lens groups.

6 Claims, 15 Drawing Sheets

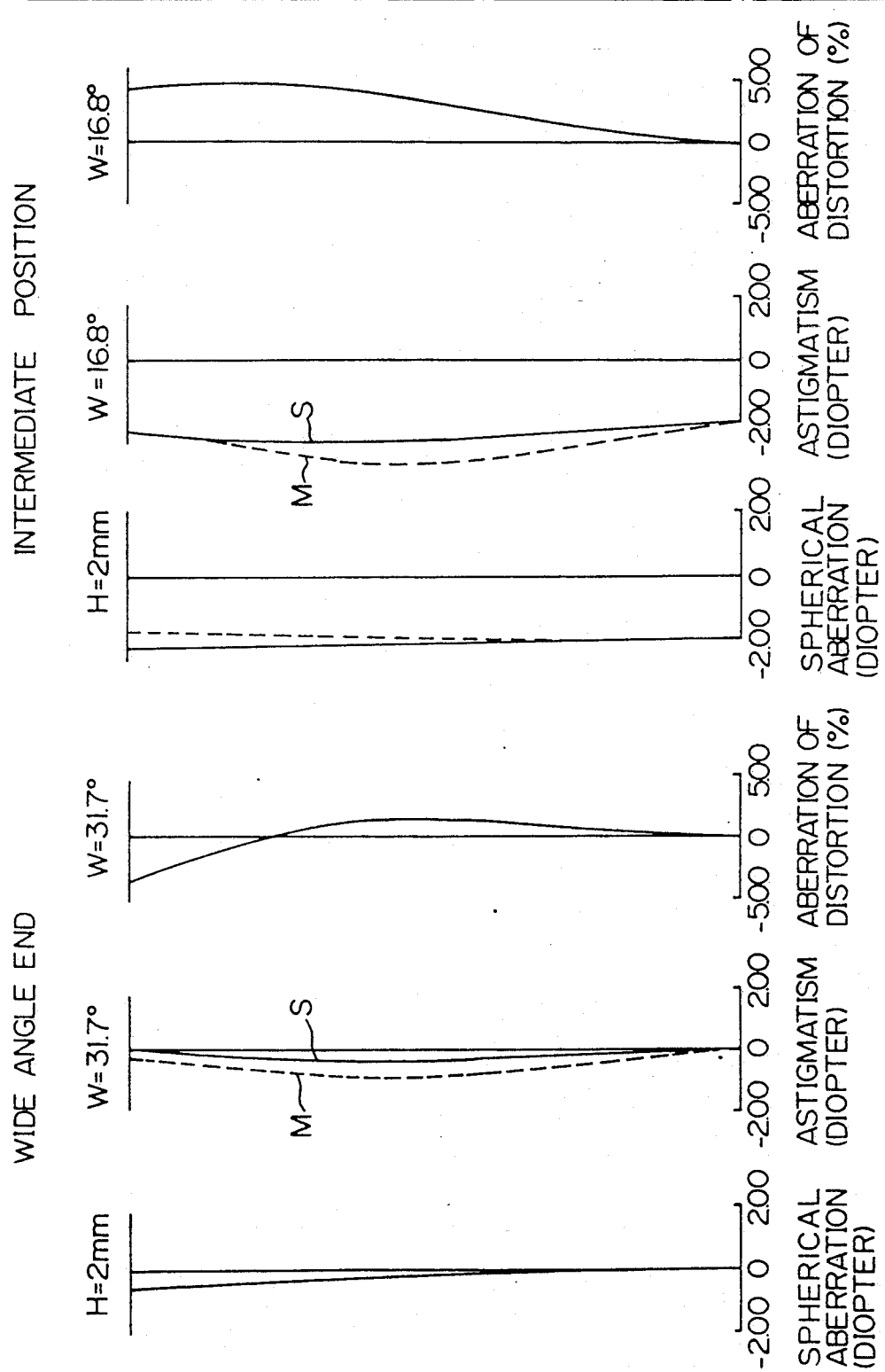

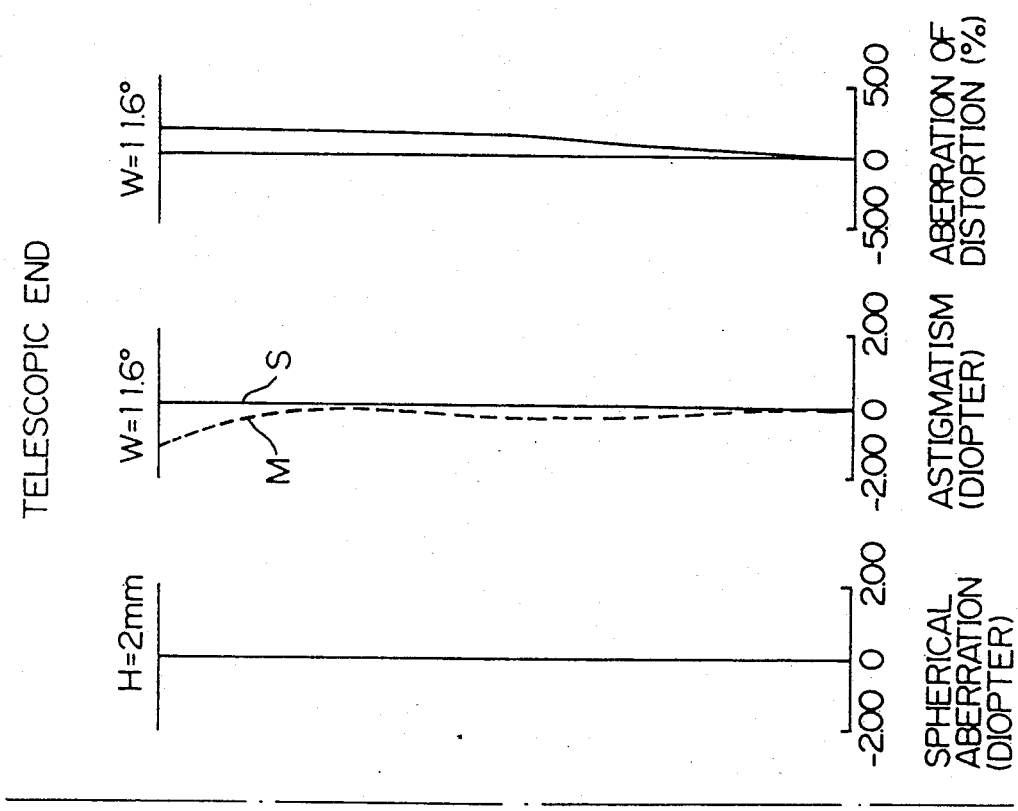

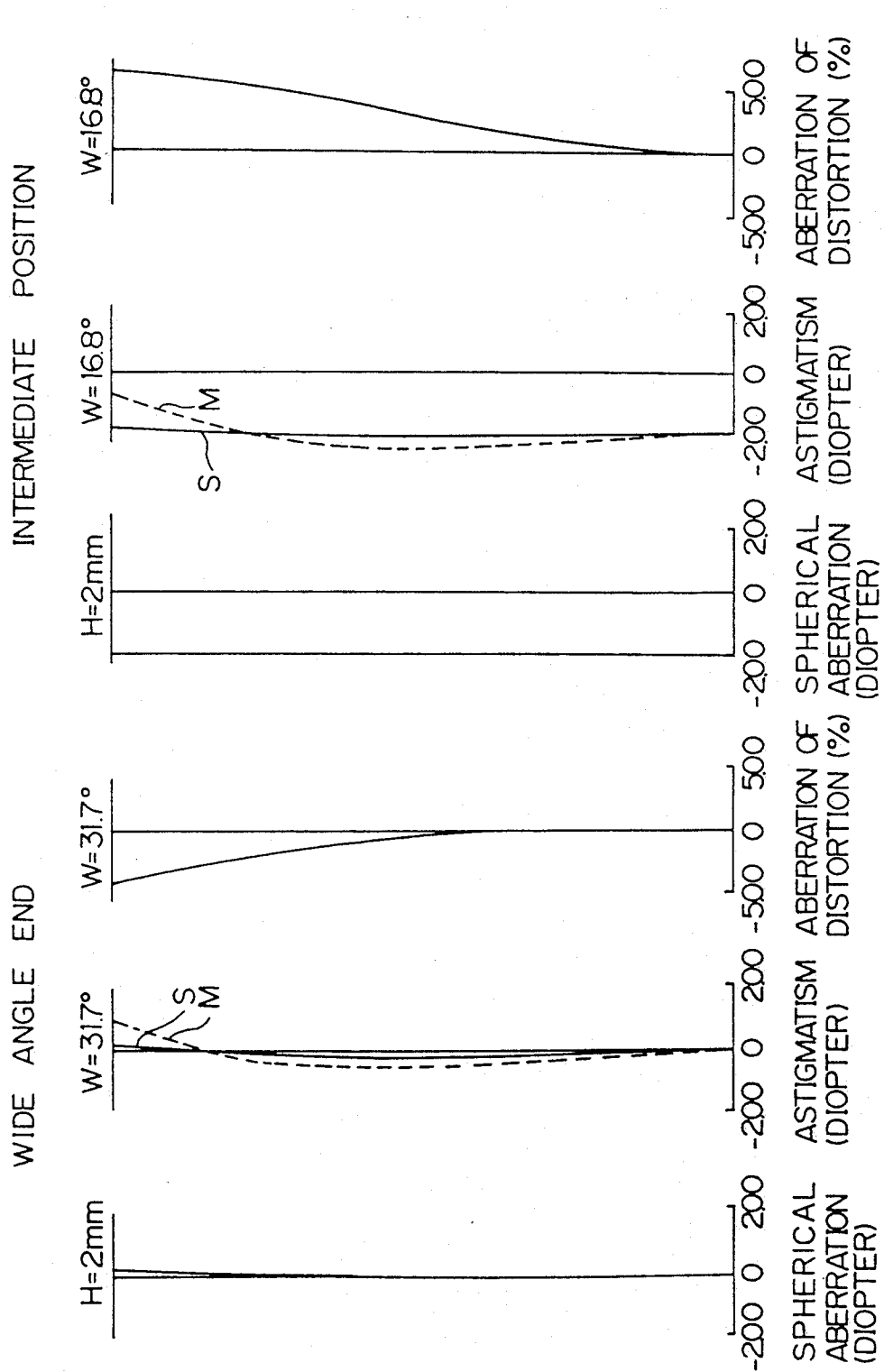

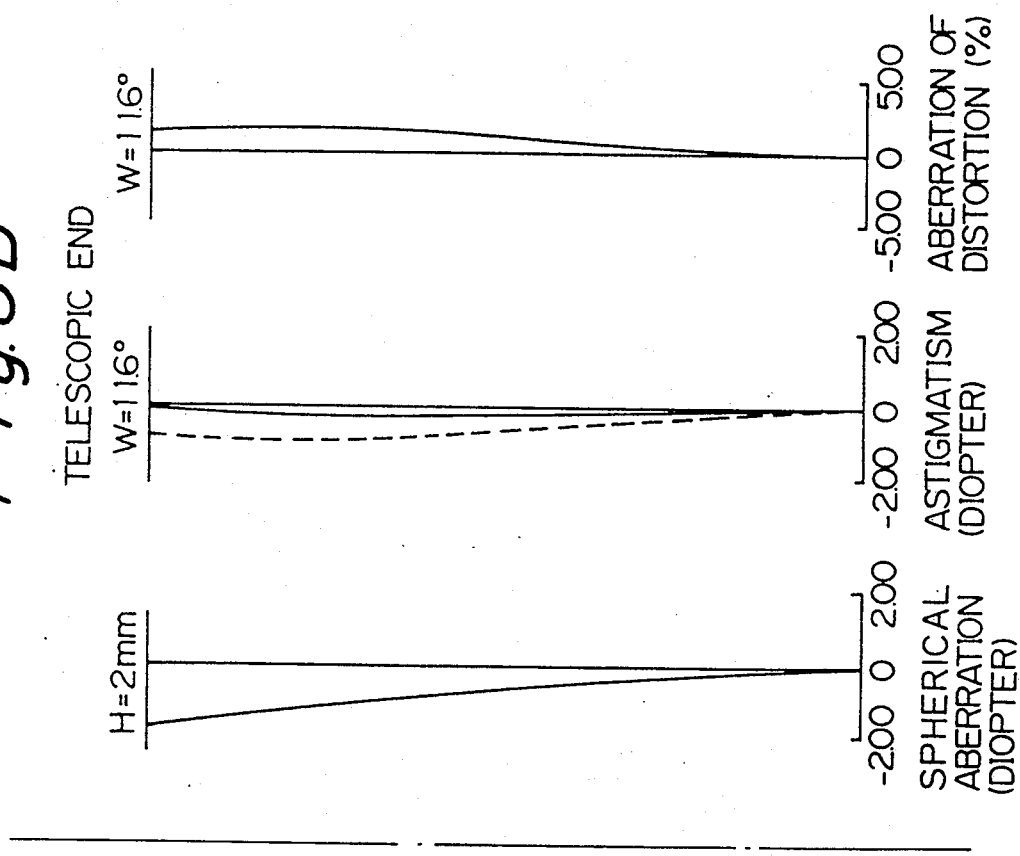

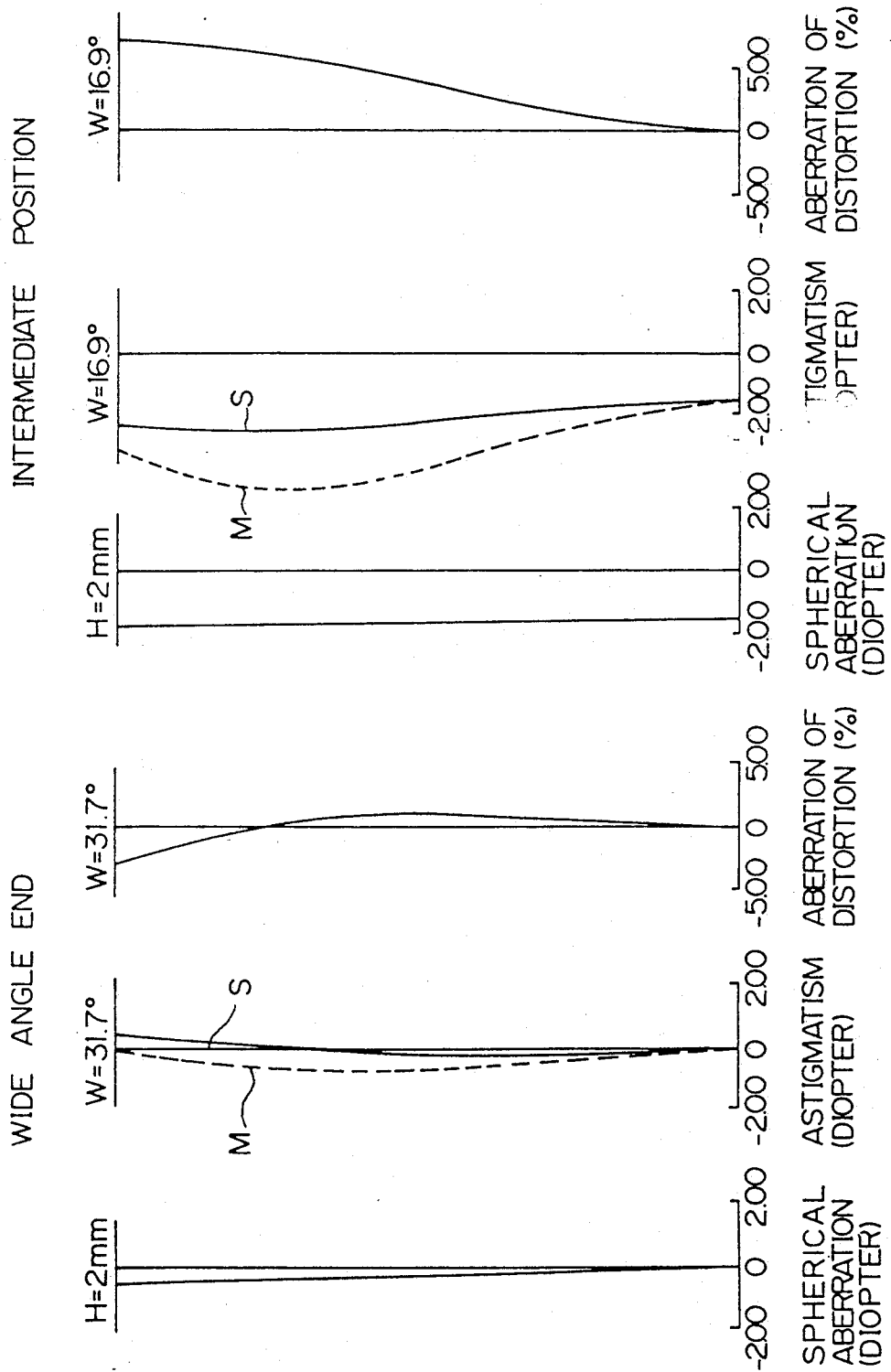

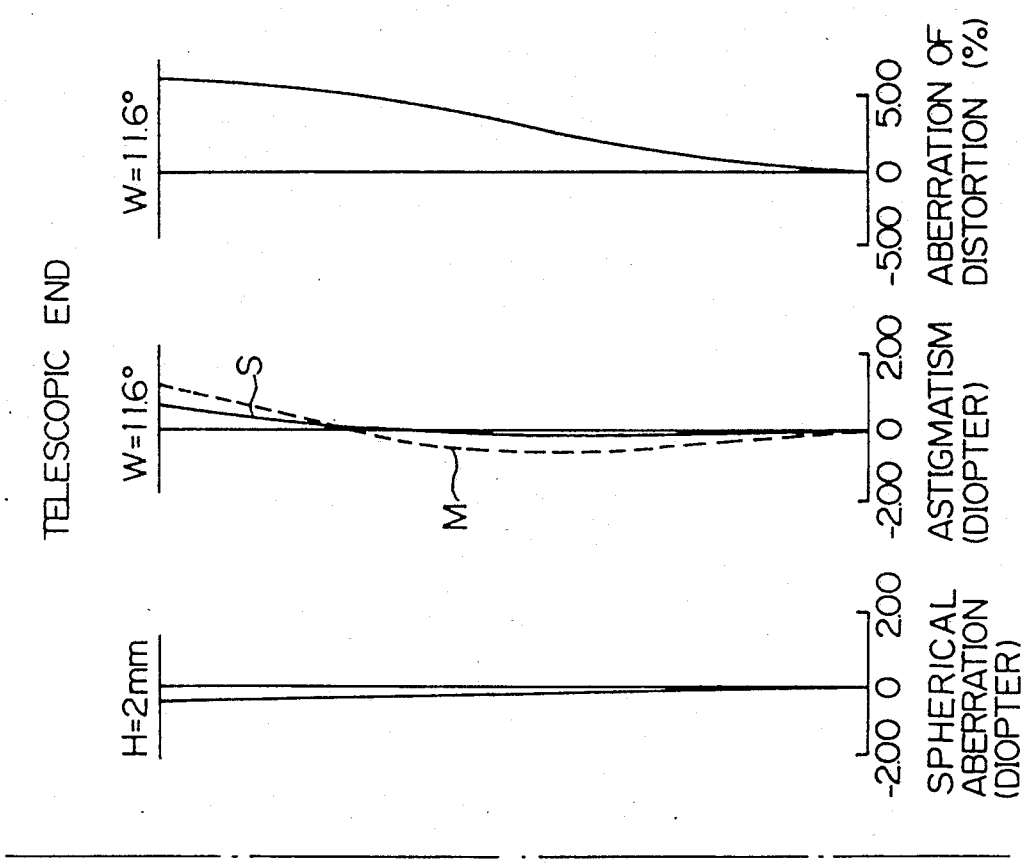

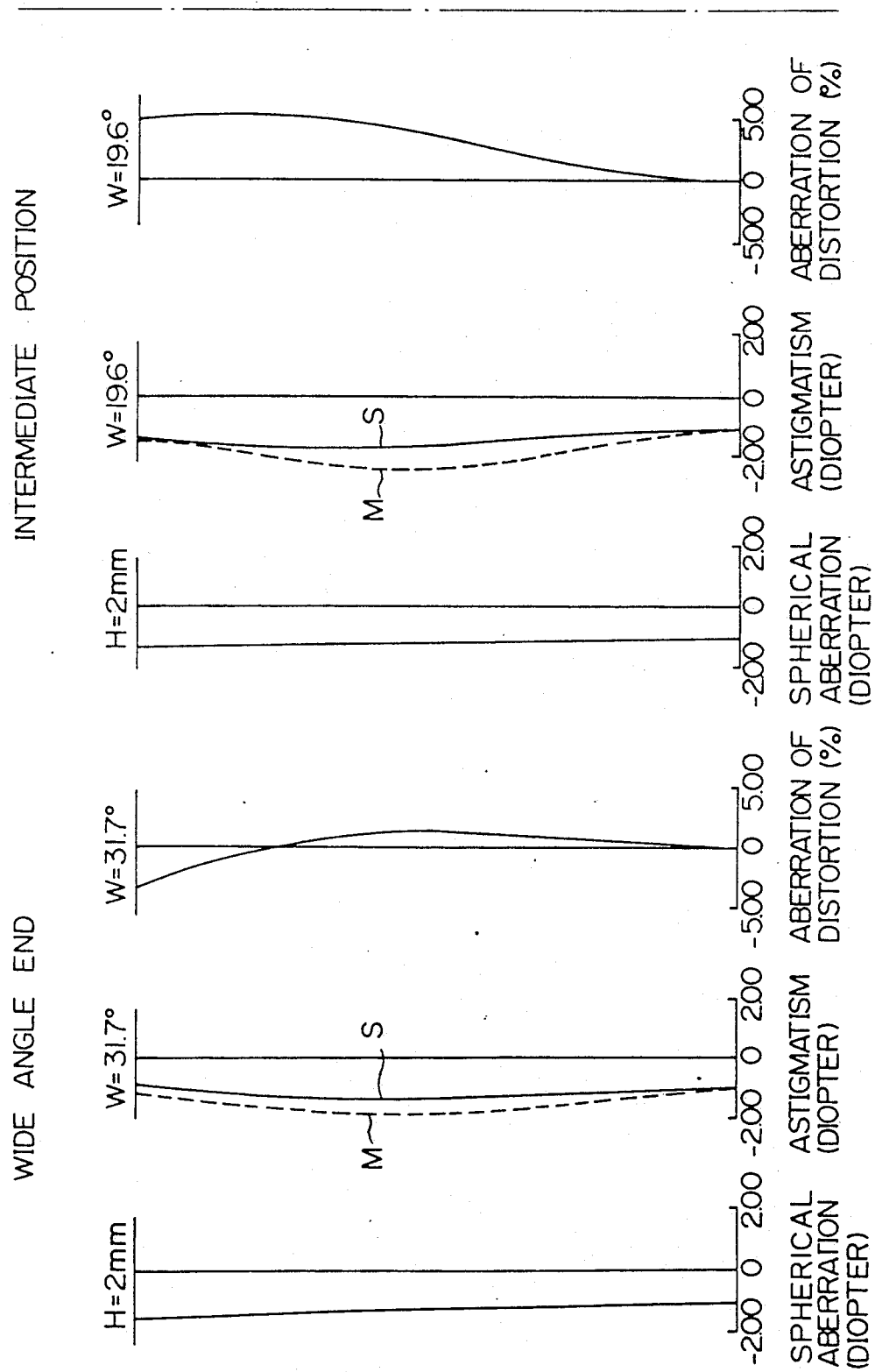

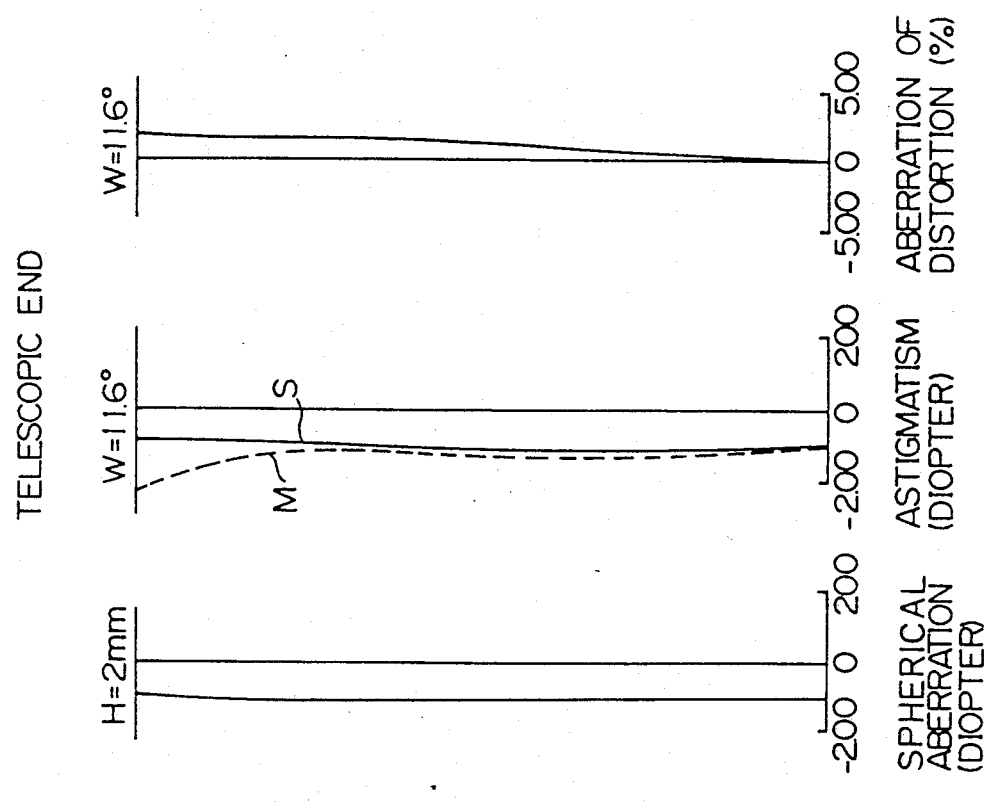

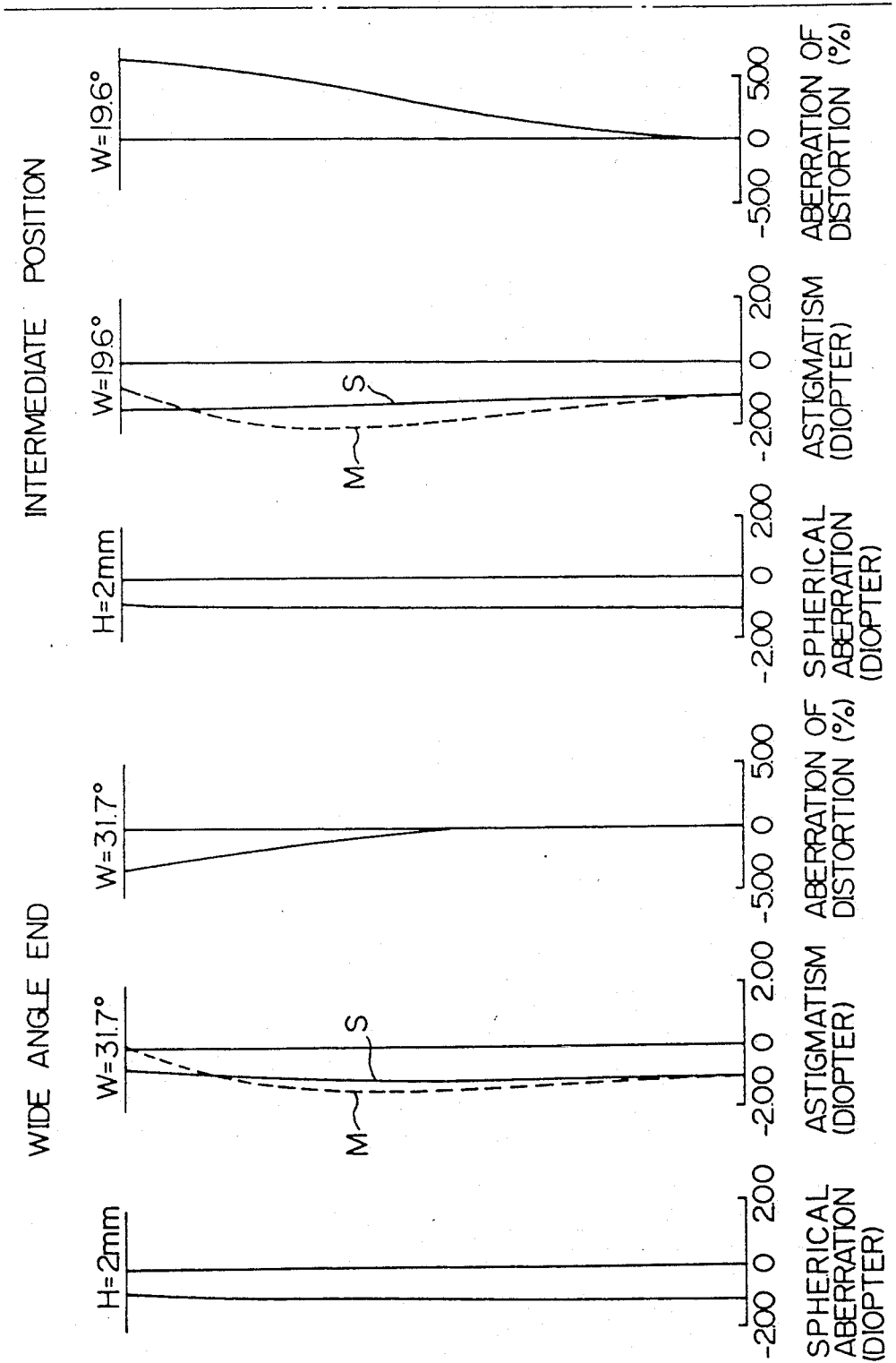

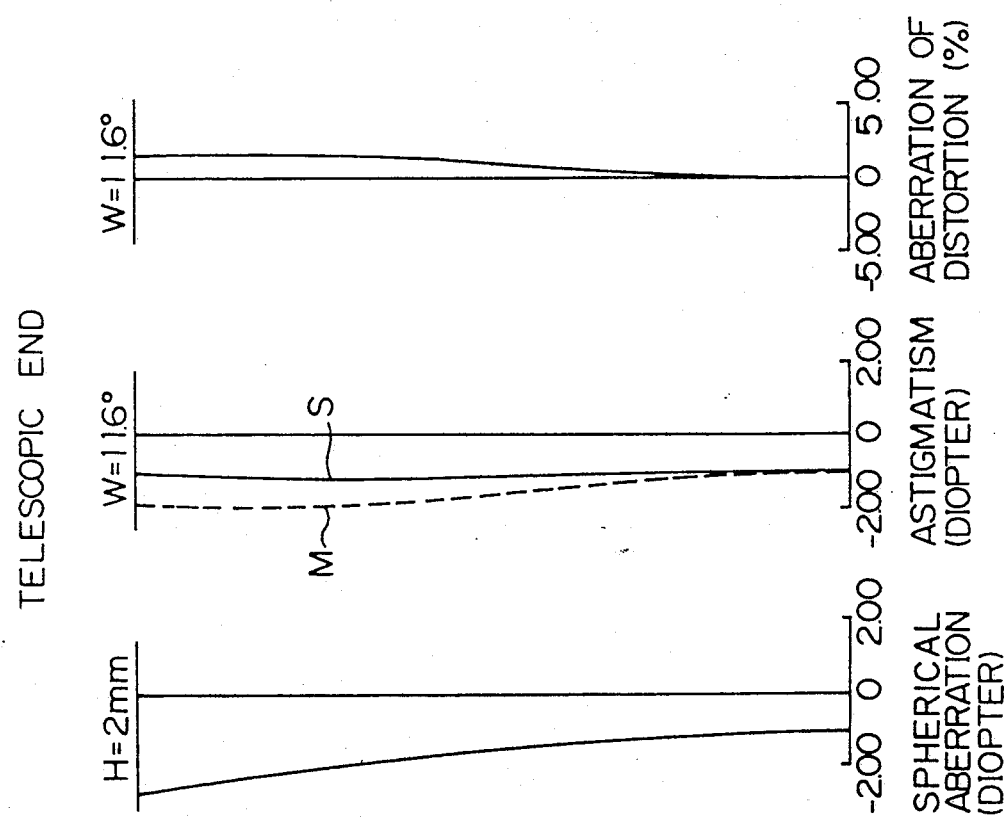

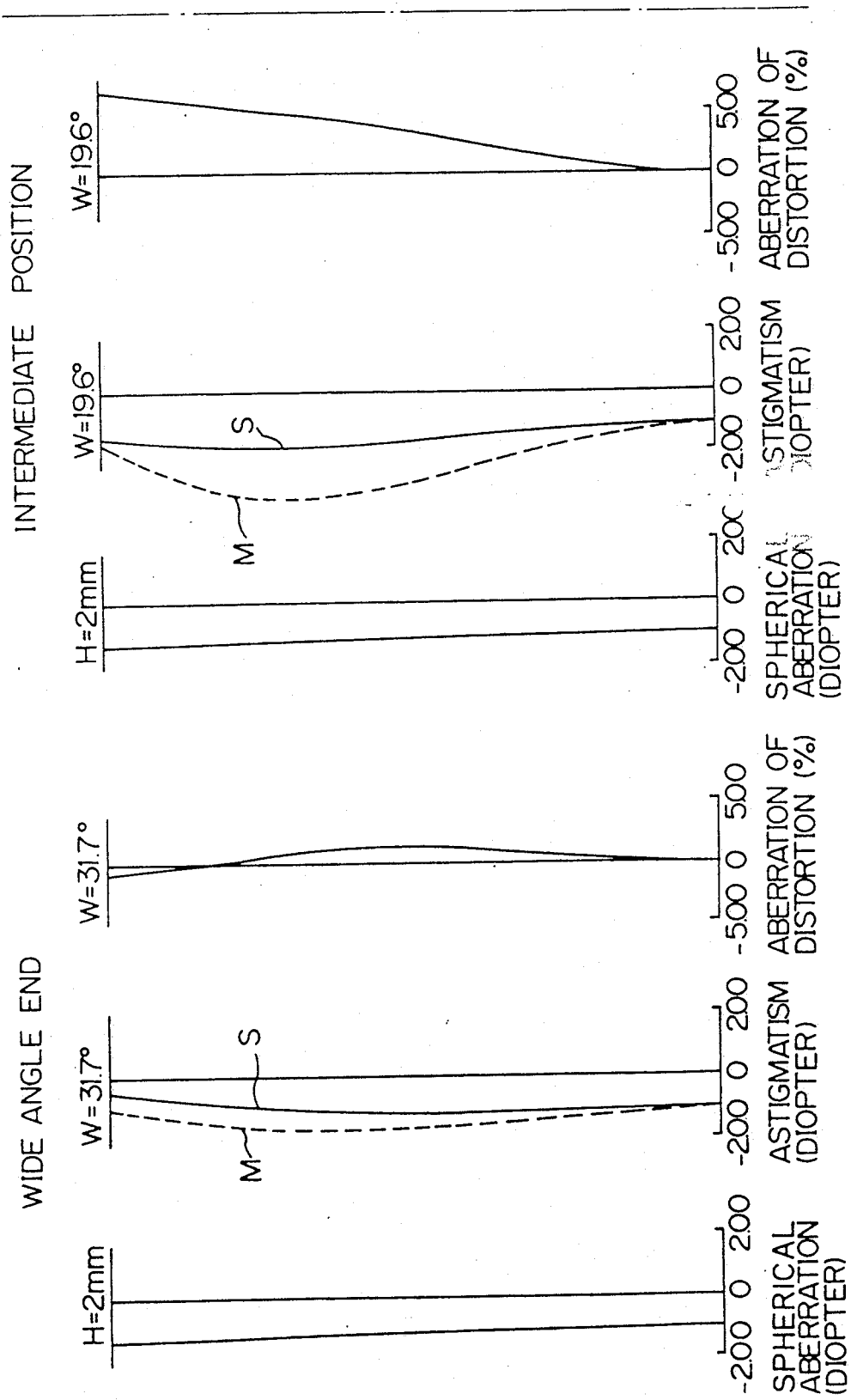

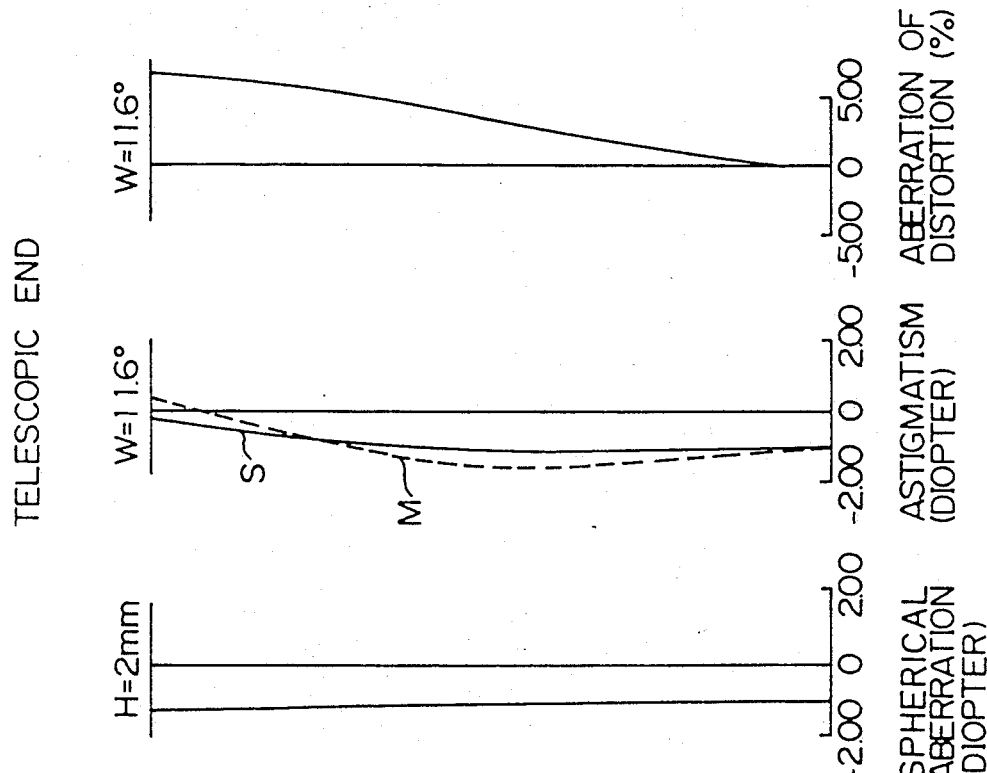

ZOOM FINDER OF REAL IMAGE TYPE

BACKGROUND OF THE INVENTION

1. Field of the Invention

The present invention relates to a zoom finder of a real image type used in a 35 mm lens shutter camera, a video camera, an electronic still camera, etc.

2. Description of the Related Art

A finder for a 35 mm lens shutter camera having a zoom lens is generally constructed by a reversed Galilean finder for observing a virtual image formed by an objective lens through an eyepiece. However, the finder of this type has the problems that lens diameter is ultimately increased when zoom ratio is increased.

In contrast to this, a Keplerian finder for forming a real image by an objective lens and observing this image through an eyepiece has the advantages that lens diameter can be reduced even when zoom ratio is increased although the entire length of the finder is increased.

Recently, the thickness of the camera has been thick by the increase in zoom ratio of a photographing lens and the Keplerian finder has been utilized in the zoom finder having a large zoom ratio.

For example, in Japanese Patent Application Laying Open (KOKAI) No. 62-7017, a zooming operation is performed by the Keplerian finder. In this case, when the zoom ratio of this finder is about 3 times, the difference in diopter between wide angle and telescopic ends and an intermediate position becomes large so that it is not practical as the finder when the zoom ratio is increased.

Further, the Keplerian finder for correcting the above difference in diopter caused by the zooming operation is shown in Japanese Patent Application Laying Open (KOKAI) Nos. 61-156018 and 61-16073. In such finders, with respect to first and second groups of lenses, the zooming operation is performed by displacing the second lens group and the change in diopter caused by this zooming operation is corrected by displacing the first lens group. In this case, the moving amount of the first lens group for correcting the difference in diopter is large so that it is difficult to design a mechanism for moving the lenses, which is not necessarily practical.

SUMMARY OF THE INVENTION

It is therefore a first object of the present invention to provide a zoom finder of a real image type in which the zooming operation is performed by only the movement of one lens group and the change in diopter caused by the zooming operation is small while a large zoom ratio about 3 times is held.

A second object of the present invention is to provide a zoom finder of a real image type in which the change in diopter caused by the zooming operation can be approximately corrected completely and the moving amount of the lens group required to correct the difference in diopter is small and the finder has a large zoom ratio about 3 times and a preferable optical performance.

The above objects of the present invention can be achieved by a zoom finder of a real image type comprising an objective lens composed of a first lens group having a positive refracting power, a second lens group having a negative refracting power, and a third lens group having a positive refracting power, the objective lens having a positive refracting power as a whole; an eyepiece composed of a fourth lens group having a positive refracting power; means for forming a real image by the objective lens between the third and fourth lens groups and observing this real image through the eyepiece; and means for increasing the magnification of the finder by moving the second lens group from an object side to an eyepiece side. The change in diopter of the finder caused by a zooming operation in the movement of the second lens group is corrected by displacing the first and third lens groups.

Further objects and advantages of the present invention will be apparent from the following description of the preferred embodiments of the present invention as illustrated in the accompanying drawings.

BRIEF DESCRIPTION OF THE DRAWINGS

FIGS. 7A to 12B are aberration diagrams relating to the embodiments of the present invention.

DESCRIPTION OF THE PREFERRED EMBODIMENTS

The preferred embodiments of a zoom finder of a real image type in the present invention will next be described in detail with reference to the accompanying drawings.

In first and second embodiments of the present invention, a zoom finder of a real image type has first to fourth lens groups. The first to third lens groups constitute an objective lens and the fourth lens group constitutes an eyepiece. The first to third lens groups constituting the objective lens have respectively positive, negative and positive refracting powers and have a positive refracting power as a whole. The fourth lens group constituting the eyepiece has a positive refracting power. The real image is formed by the objective lens between the third and fourth lens groups and is observed through the eyepiece.

The zooming operation is performed by moving the second lens group in the objective lens. When the second lens group is moved onto the eyepiece side from the object side, the magnification of the finder is increased.

In the second embodiment of the present invention, the change in diopter of the finder caused by the above zooming operation is corrected by moving the first and third lens groups.

Figure 1:
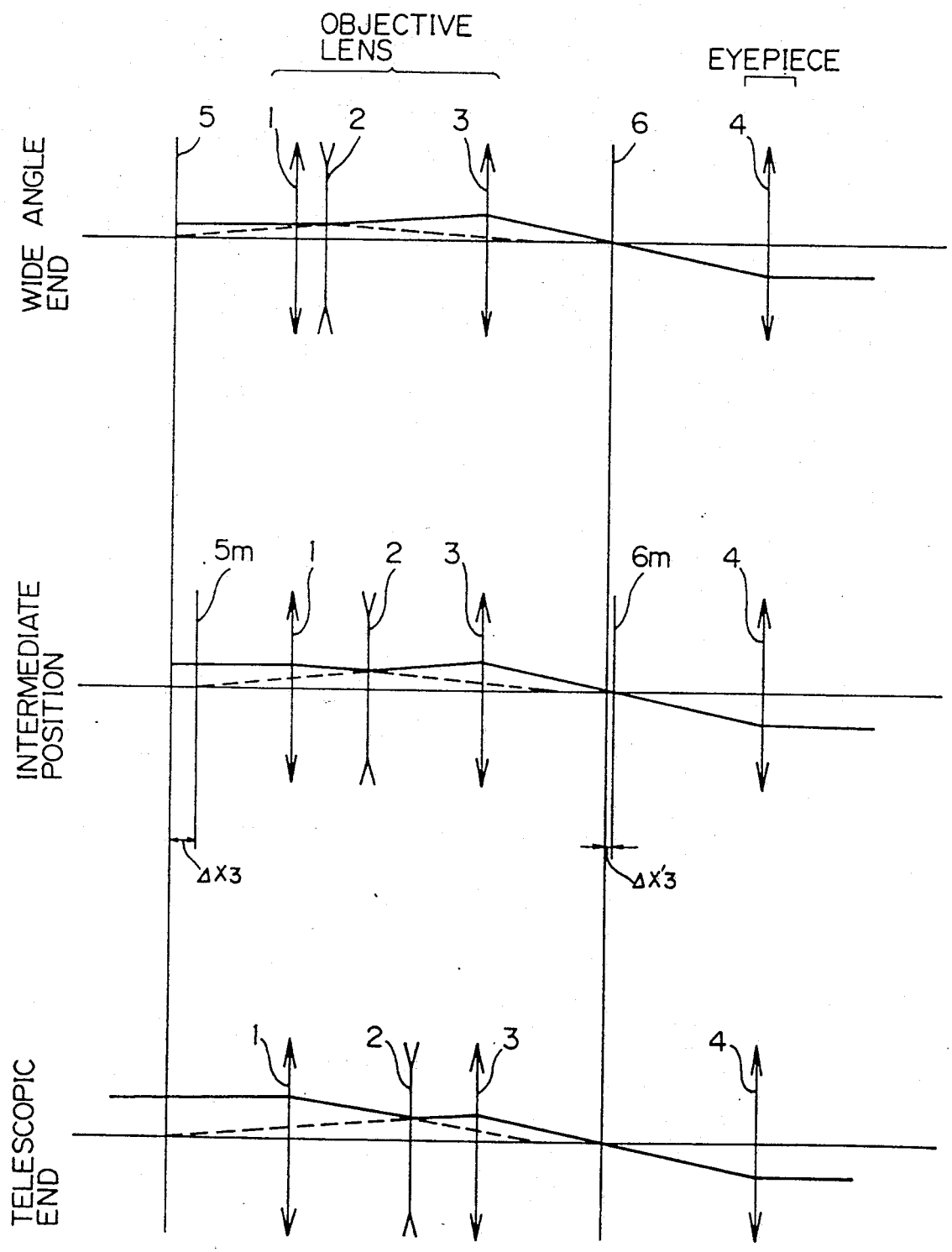
FIG. 1 is a view for explaining a zooming operation of a finder in a first embodiment of the present invention.

In FIG. 1, reference numerals 1 to 3 respectively designate the first lens group having a positive refracting power, the second lens group having a negative refracting power and the third lens group having a positive refracting power. These first to third lens groups 1 to 3 constitute the objective lens and have a positive refracting power as a whole.

Reference numeral 4 designates the fourth lens group constituting the eyepiece and having a positive refracting power.

Real images 6 and 6m are formed by the objective lens between the third and fourth lens groups and are observed through the eyepiece.

In the first embodiment of the present invention, as mentioned above, the zooming operation is performed by moving only the second lens group 2, and the other lens groups are fixed.

In the second embodiment of the present invention, the zooming operation is performed by moving the second lens group 2, but the first and third lens groups 1 and 3 are moved to correct the change in diopter caused by the zooming operation.

In the following description, various kinds of marks are defined as follows.

$f_1$: focal length of the first lens group;
$f_2$: focal length of the second lens group;
$f_3$: focal length of the third lens group;
$f_{ow}$: focal length of the objective lens at a wide angle end;
$f_{om}$: focal length of the objective lens in an intermediate position;
$f_{ot}$: focal length of the objective lens at a telescopic end:
$f_e$: focal length of the eyepiece;
$\beta_{2w}$: magnification of the second lens group at the wide angle end;
$\beta_{2m}$: magnification of the second lens group in an intermediate position;
$\beta_{2t}$: magnification of the second lens group at the telescopic end;
$\beta_3$: magnification of the third lens group at the wide angle end and the telescopic end;
$\beta_{3m}$: magnification of the third lens group in an intermediate position;
$\Delta TT_2$: difference in conjugate length of the second lens groups between the wide angle and telescopic ends and the intermediate position;
$\Delta X_3$: distance from an object point position (the position shown by reference numeral 5 in FIG. 1) of the third lens group at the wide angle and telescopic ends to an object point position thereof (the position shown by reference numeral 5m in FIG. 1) in the intermediate position;
$\Delta X_3'$: distance from an image forming position (the position shown by reference numeral 6 in FIG. 1) of the third lens group at the wide angle and telescopic ends to an image forming position thereof (the position shown by reference numeral 6m in FIG. 1) in the intermediate position; and
z: zoom ratio of the finder.

The above $\beta_{3m}$, $\Delta X_3$ and $\Delta_3'$ are values before the correction of the change in diopter in the second embodiment of the present invention.

Figure 3:
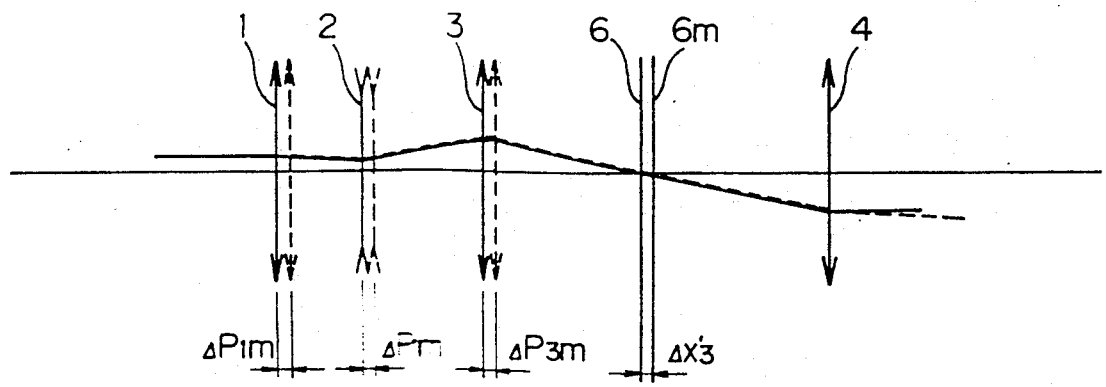

Further, in the second embodiment of the present invention, the following marks are defined with reference to FIG. 3.

$\Delta P_{1m}$: moving amount of the first lens group in the intermediate position to which the first lens group is moved at the correcting time of the diopter; and
$\Delta P_{3m}$: moving amount of the third lens group in the intermediate position to which the third lens group is moved at the correcting time of the diopter.

When the conjugate lengths of the second lens group 2 at the wide angle end and the telescopic end are equal to each other, the magnification of the second lens group is provided as follows at the wide angle end, in the intermediate position and at the telescopic end.

$$\beta_{2w} = -1/\sqrt{z} \tag{1}$$

$$\beta_{2m} = -1 \tag{2}$$

$$\beta_{2t} = -\sqrt{z} \tag{3}$$

Accordingly, the difference $\Delta TT_2$ in conjugate length of the second lens group 2 between the wide angle and telescopic ends and the intermediate position is provided as follows.

$$\Delta TT_2 = \{(1/\sqrt{z}) + \sqrt{z} - 2)\} \cdot f_2 \tag{4}$$

The distance $\Delta X_3$ from the object point position 5 of the third lens group 3 at the wide angle and telescopic ends to the object point position 5m thereof in the intermediate position is provided by the following formula.

$$\Delta X_3 = \{(1/\sqrt{z}) + \sqrt{z} - 2)\} \cdot f_2 \tag{5}$$

The distance $\Delta X_3'$ from the image forming position 6 of the third lens group 3 at the wide angle and telescopic ends to the image forming position 6m thereof in the intermediate position is provided by the following formula.

$$\Delta X_3' = \Delta X_3 \cdot \beta_{3m}^2 \tag{6}$$

From the above formulas, the difference $|\Delta Dp|$ in diopter of the finder between the wide angle and telescopic ends and the intermediate position is provided by the following formula.

$$|\Delta Dp| \doteq (|\Delta X_3'|/f_e^2) \times 1000 \tag{7}$$

In the finder shown in Japanese Patent Application Laying Open (KOKAI) No. 62-7017, $\beta_{3m} \approx 1$ is set so that the finder diopter difference $|\Delta D'p|$ is provided as follows.

$$|\Delta D'p| \approx (|\Delta X_3|/f_e^2) \times 1000 \tag{8}$$

However, in the present invention, $|\beta_{3m}|$ can be set to a value smaller than 1 so that $|\Delta X_3'| < |\Delta X_3|$ is set and the diopter difference $|\Delta Dp|$ can be set to be smaller than $|\Delta D'p|$. Namely, in the first embodiment of the present invention, it is possible to sufficiently reduce the finder diopter difference caused by the zooming operation although the zooming operation is performed while only the second lens group is displaced and the other lens groups are fixed.

In the second embodiment of the present invention, the above finder diopter difference $|\Delta Dp|$ is corrected by displacing the first and third lens groups 1 and 3.

Figure 2:
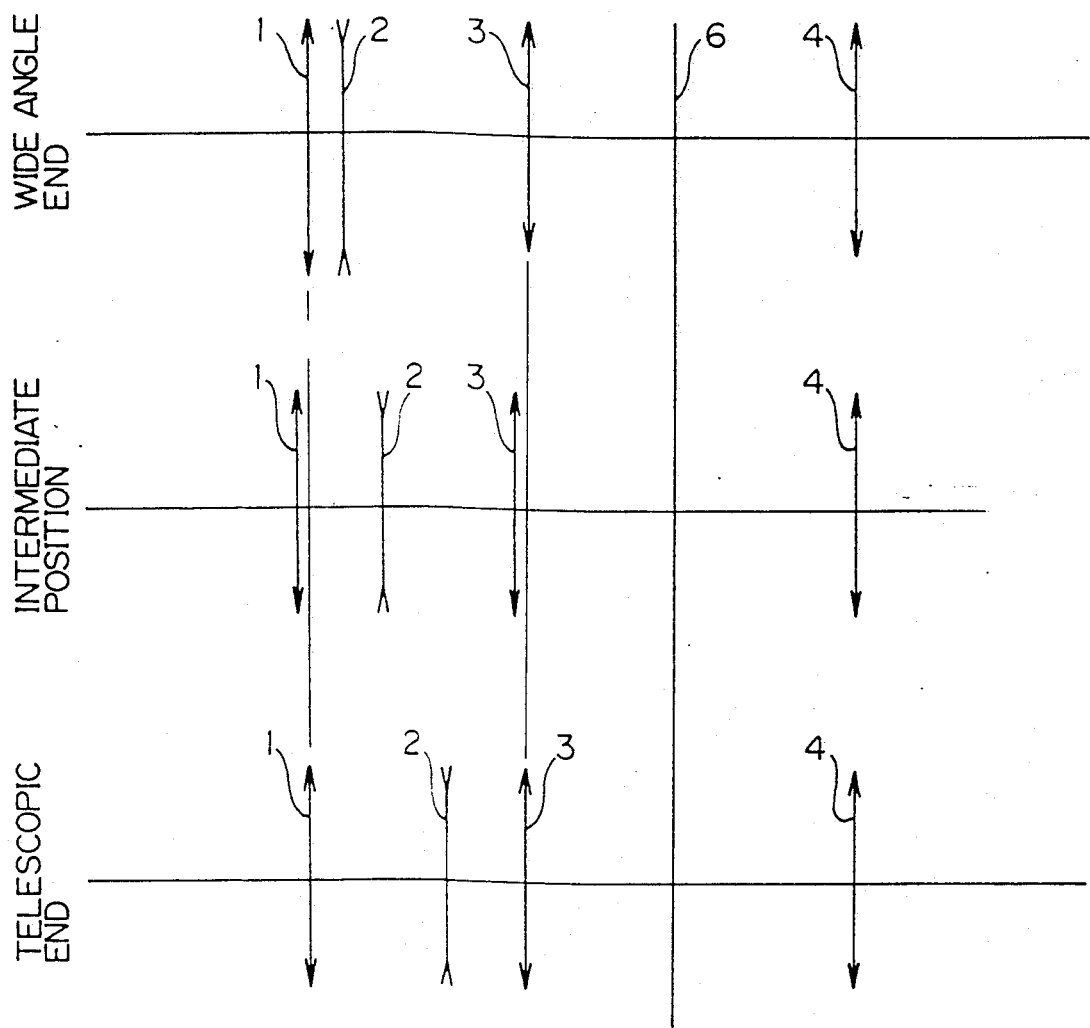
FIGS. 2 and 3 are views for explaining the correction of diopter in a finder in a second embodiment of the present invention.

As shown in FIG. 2, the first and third lens groups 1 and 3 are displaced in the intermediate position to correct the diopter.

In FIG. 3, the first and second lens groups 1 and 2 are moved by a distance $\Delta P_{1m}$ and the third lens group 3 is moved by a distance $\Delta P_{3m}$ to correct the image forming position 6m of the objective lens in the intermediate position. In this case, when the moving direction toward the eyepiece is a positive direction, the following formula is formed.

$$\Delta X_3' = (\Delta P_{3m} - \Delta P_{1m}) \cdot \beta_3^2 m - \Delta P_{3m} \quad (9)$$

In this case, from the above formulas (6) and (9), the following formula is obtained.

$$\Delta X_3 = \{1 - (1/\beta_3^2 m)\} \cdot \Delta P_{3m} - \Delta P_{1m} \quad (10)$$

From the above results, it is preferable to set the following inequality and equality, $$|\beta_{3m}| < 1 \quad (11)$$

$$\Delta P_{1m} = \Delta P_{3m} \quad (12)$$

to reduce the moving amounts of the lens groups for correction so as to constantly hold the finder diopter.

Using the formulas (10) and (12), the following formula is provided.

$$\Delta P_{1m} = -\beta_3^2 m \cdot \Delta X_3 = -\Delta X_3' \quad (13)$$

Namely, it is enough to move the first to third lens groups 1 to 3 by the same amount as the displacing amount $\Delta X_3'$ of the image forming position in a direction opposite to the displacing direction of the image forming position, thereby performing the above correction.

At this time, $|\Delta P_{1m}|$ can be set to be smaller than $|\Delta X_3|$ from the inequality (11) so that it is possible to reduce the moving amounts of the first and third lens groups for diopter correction in comparison with those in the conventional finder.

In the first and second embodiments of the present invention, it is desirable to satisfy the following condition.

$$2.0 < |f_1/f_2| < 3.5 \quad (I)$$

This condition (I) relates to the distance between the first and second lens groups 1 and 2. When the absolute value in this condition exceeds a lower limit, this distance is excessively small so that it is difficult to really arrange the lenses.

In contrast to this, when the above absolute value exceeds an upper limit, the distance between the first and second lens groups is excessively large and the diameter of the first lens group becomes large so that it is not practical and it is difficult to correct aberration.

In the first and second embodiments of the present invention, it is desirable to satisfy the following condition.

$$0.3 < \sqrt{f_{ow} \cdot f_{ot}}/f_1 < 1 \quad (II)$$

This second condition (II) relates to the magnification of the third lens group. When the ratio in this condition exceeds a lower limit, the absolute value $|\beta_3|$ of the magnification of the third lens group is excessively small and the distance between the second and third lens groups at the wide angle end is excessively large. Therefore, the diameter of the first lens group becomes large and it is not practical.

It is possible to reduce the distance between the second and third lens groups by reducing the $f_3$. However, when the $f_3$ is excessively reduced, it is difficult to correct aberration.

In contrast to this, when the ratio in the above condition (II) exceeds an upper limit, the magnification of the third lens group is large so that the shift in image forming position caused by the third lens group cannot be reduced.

In the first and second embodiments of the present invention, it is desirable to satisfy the following condition.

$$0.5 < |f_1 \cdot f_3/(f_2 \cdot f_{ot})| < 2 \quad (III)$$

This condition (III) relates to the distance between the second and third lens groups at the telescopic end. When the absolute value in this condition exceeds a lower limit, the distance between the second and third lens groups is excessively small so that it is difficult to provide a real construction of the lenses. When the absolute value in this condition exceeds an upper limit, the diameter of the first lens group at the telescopic end is large so that it is not practical.

In the present invention, a light beam can be guided to a pupil by suitably setting the focal distances of the first to third lens groups without especially disposing a condenser lens in the vicinity of the image forming position.

The concrete embodiments of the present invention will next be described.

Figure 4:
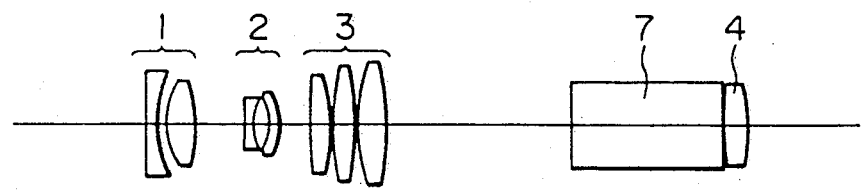
FIGS. 4 to 6 are views showing the construction of lenses in the embodiments of the present invention.
Figure 5:
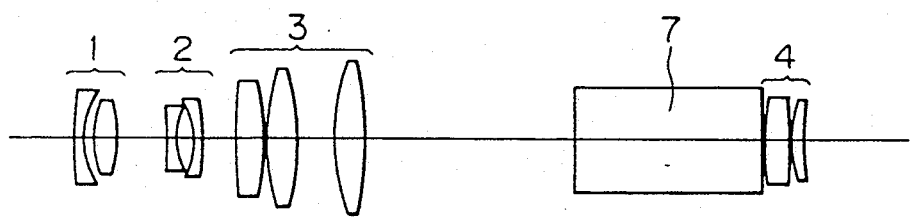
Figure 6:
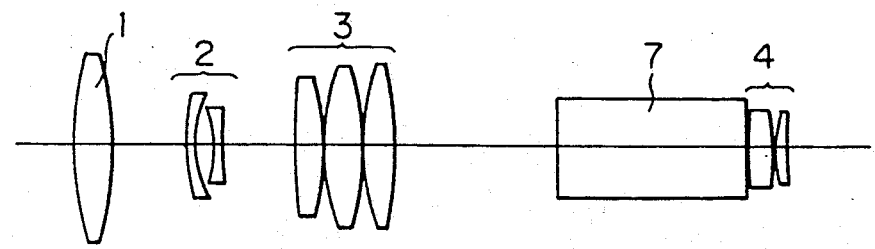

FIGS. 4 to 6 show concrete lens constructions in the respective embodiments.

In FIGS. 4 to 6, similar to FIGS. 1 to 3, reference numerals 1 to 4 respectively designate first to fourth lens groups. A Porro prism 7 is disposed to reverse a real image formed by the objective lens with respect to the right-hand and left-hand directions and the upward and downward directions. For brevity, this Porro prism 7 is developed as a glass block in the figures.

In the respective embodiments, the radius of curvature of an i-th face (including incident and light-emitting faces of the Porro prism 7) from the object side is denoted by $r_i$. The distance between i-th faces is denoted by $d_i$. The refractive index and the Abbe number of a material of a j-th light-receiving element (including the Porro prism 7) from the object side are respectively denoted by $n_j$ and $\nu_j$.

A lens face having mark * is an aspheric surface. In the following description, the changing amount of the lens face in the direction of an optical axis is denoted by x, the displacing amount of the lens face in a direction perpendicular to the optical axis is denoted by y, a conical constant is denoted by k, and aspherical coefficients are denoted by $A_4$ and $A_6$. In this case, as is well known, the following formula is provided.

$$x = (1/ri) \cdot y^2/[1 + \sqrt{1 - (1 + k) \cdot (y/ri)^2}] + A_4 \cdot y^4 + A_6 \cdot y^6$$

With respect to the following embodiments 1 to 6, the embodiments 1 to 3 relate to the first embodiment of the present invention.

Embodiment 1

The first to fourth lens groups 1 to 4 are respectively constructed by two lenses, two lenses, three lenses, and a single lens.

Half angle of view: 31.7 to 11.6 degrees

| i | $r_i$ | $d_i$ | j | $n_j$ | $\nu_j$ |
|---|---|---|---|---|---|
| 1 | −373.355 | 1 | 1 | 1.4919 | 57.4 |
| 2* | 10.418 | 1.5 | | | |
| 3* | 9.276 | 4 | 2 | 1.4919 | 57.4 |
| 4* | −13.943 | Variable | | | |
| 5 | −84.688 | 1 | 3 | 1.4919 | 57.4 |
| 6* | 5.417 | 2.6 | | | |
| 7* | −4.951 | 1 | 4 | 1.4919 | 57.4 |
| 8 | −7.141 | Variable | | | |
| 9 | 73.892 | 3 | 5 | 1.4919 | 57.4 |
| 10 | −22.934 | 0.2 | | | |
| 11 | 31.886 | 3 | 6 | 1.4919 | 57.4 |
| 12 | −46.922 | 0.2 | | | |
| 13 | 19.556 | 4 | 7 | 1.4919 | 57.4 |
| 14* | −27.181 | 24.143 | | | |
| 15 | ∞ | 20 | 8 | 1.5168 | 64.2 |
| 16 | ∞ | 0.2 | | | |
| 17* | 33.906 | 3.5 | 9 | 1.4919 | 57.4 |
| 18* | −17.495 | | | | |

Variable distance

| Angle of view (degrees) | 31.7 | 16.8 | 11.6 |
|---|---|---|---|
| $d_4$ | 0.468 | 6.324 | 9.705 |
| $d_8$ | 9.989 | 4.133 | 0.751 |

Aspheric surface

| i | k | $A_4$ | $A_6$ |
|---|---|---|---|
| 2 | −1.966 | 0 | 0 |
| 3 | −0.12 | $4.527 \times 10^{-5}$ | $-4.278 \times 10^{-6}$ |
| 4 | −10.892 | $6.833 \times 10^{-6}$ | $-1.035 \times 10^{-6}$ |
| 6 | −1.536 | 0 | 0 |
| 7 | −0.55 | 0 | 0 |
| 14 | −42.198 | 0 | 0 |
| 17 | −10.056 | 0 | 0 |
| 18 | −3.303 | 0 | 0 |

Embodiment 2

The first to fourth lens groups 1 to 4 are respectively constructed by two lenses, two lenses, three lenses, and two lenses.

Half angle of view: 31.7 to 11.6 degrees

| i | $r_i$ | $d_i$ | j | $n_j$ | $\nu_j$ |
|---|---|---|---|---|---|
| 1 | 38.017 | 1 | 1 | 1.4919 | 57.4 |
| 2* | 9.133 | 1.5 | | | |
| 3* | 11.23 | 3 | 2 | 1.4919 | 57.4 |
| 4* | −14.204 | Variable | | | |
| 5 | −41.035 | 1 | 3 | 1.4919 | 57.4 |
| 6* | 8.041 | 2.7 | | | |
| 7* | −8.695 | 1 | 4 | 1.4919 | 57.4 |
| 8 | −26.375 | Variable | | | |
| 9* | 52.353 | 4 | 5 | 1.4919 | 57.4 |
| 10 | −27.838 | 0.2 | | | |
| 11 | 29.681 | 4 | 6 | 1.4919 | 57.4 |
| 12 | −39.543 | 5 | | | |
| 13* | 21.944 | 4 | 7 | 1.4919 | 57.4 |
| 14* | −41.046 | 27.77 | | | |
| 15 | ∞ | 25 | 8 | 1.5168 | 64.2 |
| 16 | ∞ | 0.2 | | | |
| 17 | 38.741 | 3.5 | 9 | 1.4919 | 57.4 |
| 18 | −104.732 | 0.2 | | | |
| 19 | 18.819 | 1.5 | 10 | 1.4919 | 57.4 |
| 20 | 49.456 | | | | |

Variable distance

| Angle of view (degrees) | 31.7 | 16.8 | 11.6 |
|---|---|---|---|
| $d_4$ | 0.415 | 6.638 | 10.23 |
| $d_8$ | 10.318 | 4.092 | 0.503 |

Aspheric surface

| i | k | $A_4$ | $A_6$ |
|---|---|---|---|
| 2 | −0.666 | 0 | 0 |
| 3 | −0.0411 | $-3.97 \cdot 10^{-6}$ | $-2.225 \cdot 10^{-7}$ |
| 4 | −9.893 | 0 | 0 |

-continued

| i | k | $A_4$ | $A_6$ |
|---|---|---|---|
| 6 | −1.941 | 0 | 0 |
| 7 | −1.135 | 0 | 0 |
| 9 | −19.606 | 0 | 0 |
| 13 | −3.373 | 0 | 0 |
| 14 | −44.249 | 0 | 0 |

Embodiment 3

The first to fourth lens groups 1 to 4 are respectively constructed by a single lens, two lenses, three lenses, and two lenses.

Half angle of view: 31.7 to 11.6 degrees

| i | $r_i$ | $d_i$ | j | $n_j$ | $\nu_j$ |
|---|---|---|---|---|---|
| 1 | 38.464 | 5 | 1 | 1.4919 | 57.4 |
| 2* | −38.555 | Variable | | | |
| 3 | 27.569 | 1 | 2 | 1.4919 | 57.4 |
| 4* | 10.897 | 2.7 | | | |
| 5* | −13.532 | 1 | 3 | 1.4919 | 57.4 |
| 6 | 46.727 | Variable | | | |
| 7* | 64.477 | 4 | 4 | 1.4919 | 57.4 |
| 8* | −31.676 | 0.2 | | | |
| 9 | 32.734 | 5 | 5 | 1.4919 | 57.4 |
| 10 | −36.582 | 0.2 | | | |
| 11 | 29.365 | 4 | 6 | 1.4919 | 57.4 |
| 12* | −39.029 | 21.497 | | | |
| 13 | ∞ | 25 | 7 | 1.51168 | 64.2 |
| 14 | ∞ | 0.2 | | | |
| 15 | −166.45 | 3.5 | 8 | 1.4919 | 57.4 |
| 16* | −17.612 | 0.2 | | | |
| 17 | 17.233 | 1.5 | 9 | 1.4919 | 57.4 |
| 18 | 33.868 | | | | |

Variable distance

| Angle of view (degrees) | 31.7 | 16.9 | 11.6 |
|---|---|---|---|
| $d_4$ | 0.166 | 9.683 | 15.177 |
| $d_6$ | 19.311 | 9.794 | 4.3 |

Aspheric surface

| i | k | $A_4$ | $A_6$ |
|---|---|---|---|
| 2 | −13.459 | 0 | 0 |
| 4 | −1.767 | 0 | 0 |
| 5 | −2.662 | 0 | 0 |
| 7 | −15.814 | 0 | 0 |
| 8 | −2.155 | 0 | 0 |
| 12 | −50.618 | 0 | 0 |
| 15 | −158.155 | 0 | 0 |
| 16 | −3.747 | 0 | 0 |

The following Embodiments 4 to 6 relate to the second embodiment of the present invention.

Embodiment 4

The lens construction is similar to that in the above Embodiment 1. The face distance $d_{14}$ in the above Embodiment 1 is variable.

Variable distance

| Angle of view (degrees) | 31.7 | 19.6 | 11.6 |
|---|---|---|---|
| $d_4$ | 0.468 | 5.156 | 9.705 |
| $d_8$ | 9.989 | 5.301 | 0.751 |
| $d_{14}$ | 23.567 | 24.625 | 23.567 |

Embodiment 5

The lens construction is similar to that in the above Embodiment 2. The face distance $d_{14}$ in the above Embodiment 2 is variable.

Variable distance

| Angle of view (degrees) | 31.7 | 19.6 | 11.6 |
|---|---|---|---|
| $d_4$ | 0.415 | 5.396 | 10.23 |
| $d_8$ | 10.318 | 5.336 | 0.503 |
| $d_{14}$ | 26.952 | 28.427 | 26.952 |

Embodiment 6

The lens construction is similar to that in the above Embodiment 3. The face distance $d_{12}$ in the above Embodiment 3 is variable.

Variable distance

| Angle of view (degrees) | 31.7 | 19.6 | 11.6 |
|---|---|---|---|
| $d_2$ | 0.166 | 7.942 | 15.177 |
| $d_6$ | 19.311 | 11.535 | 4.3 |
| $d_{12}$ | 20.929 | 21.74 | 20.929 |

The values of respective parameters in the above conditions (I), (II) and (III) are shown in the following Table.

TABLE

| Parameters | Embodiment Nos. | | |
|---|---|---|---|
| | (1, 4) | (2, 5) | (3, 6) |
| $|f_1/f_2|$ | 2.75 | 2.824 | 3.077 |
| $\sqrt{f_{ow} \cdot f_{ot}}/f_1$ | 0.643 | 0.722 | 0.435 |
| $|f_1 \cdot f_3/(f_2 \cdot f_{ot})|$ | 1.318 | 1.318 | 1.436 |

FIGS. 7A to 9B are respectively aberration diagrams with respect to the Embodiment 1 to 3. FIGS. 10A to 12B are respectively aberration diagrams with respect to the Embodiments 4 to 6.

In the respective aberration diagrams, reference numerals S, M, H and ω respectively designate a sagittal image surface, a meridional image surface, the height of a pupil, and a half angle of view.

As mentioned above, the present invention can provide a novel zoom finder of a real image type.

In this finder having the above-mentioned construction in the first embodiment, the change in diopter caused by the zooming operation is small while a high zoom ratio is held. In the finder of the second embodiment, the above change in diopter cannot be substantially caused and the finder has a high performance and can be practically used.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom finder of a real image type, comprising: an objective lens composed, in order from an object side, a first lens group having a positive refracting power, a second lens group having a negative refracting power, and a third lens group having a positive refracting power, said objective lens having a positive refracting power as a whole and an eyepiece arranged next to said third lens group and composed of a fourth lens group having a positive refracting power, said objective lens forming a real image between said third lens group and said fourth lens group, said real image being observed through said eyepiece, said second lens group being capable of moving from said object side toward said eyepiece so as to increase a magnification of said finder, a first position in which said first lens group is positioned at a wide angle end being the same as a second position in which said first lens group is positioned at a telescopic end, a third position in which said third lens group is positioned at said wide angle end being the same as fourth position in which said third lens group is positioned at said telescopic end.

2. A zoom finder according to claim 1, which is adapted to perform a zooming operation by moving only said second lens group while fixing the others of said first, third and fourth lens group.

3. A zoom finder according to claim 1 adapted that a change in diopter of said finder a zooming operation in said movement of said second lens group is corrected by displacing said first lens group and said third lens group, and said first lens group and said second lens group are moved by the same moving amount in an intermediate position so as to correct said diopter change.

4. A zoom finder according to claim 2 or 3, which satisfies the following condition:

$$2.0 < |f_1/f_2| < 3.5$$

wherein $f_1$ is a focal length of said first lens group, and $f_2$ is a focal length of said second lens group.

5. A zoom finder according to claim 2 or 3, which satisfies the following condition:

$$0.3 < \sqrt{f_{ow} \cdot f_{ot}}/f_1 < 1$$

wherein $F_{ow}$ is a focal length of said objective lens at said wide angle end, $f_{ot}$ is a focal length of said objective lens at said telescopic end, and $f_1$ is a focal length of said first lens group.

6. A zoom finder according to claim 2 or 3, which satisfies the following condition:

$$0.5 < |f_1 \cdot f_3/(f_2 \cdot f_{ot})| < 2$$

wherein $f_1$ is a focal length of said first lens group, $f_2$ is a focal length of said second lens group, $f_3$ is a focal length of said third lens group, and $f_{ot}$ is a focal length of said objective lens at said telescopic end.

* * * * *